(12) United States Patent
Luo

(10) Patent No.: US 10,306,360 B2
(45) Date of Patent: May 28, 2019

(54) METHOD AND DEVICE FOR PROCESSING RECEIVED SOUND AND MEMORY MEDIUM, MOBILE TERMINAL, ROBOT HAVING THE SAME

(71) Applicant: CLOUDMINDS (SHENZHEN) TECHNOLOGIES CO., LTD., Beijing (CN)

(72) Inventor: Lei Luo, Beijing (CN)

(73) Assignee: CLOUDMINDS (SHENZHEN) TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 15/631,687

(22) Filed: Jun. 23, 2017

(65) Prior Publication Data

US 2017/0287468 A1   Oct. 5, 2017

Related U.S. Application Data

(63) Continuation of application No. PCT/CN2016/096361, filed on Aug. 23, 2016.

(30) Foreign Application Priority Data

Aug. 31, 2015 (CN) .......................... 2015 1 0546558

(51) Int. Cl.
*G10L 21/00* (2013.01)
*H04R 3/00* (2006.01)
(Continued)

(52) U.S. Cl.
CPC .............. *H04R 3/005* (2013.01); *H04M 1/19* (2013.01); *H04M 1/6008* (2013.01); *H04S 3/006* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 6,788,337 B1 * | 9/2004 | Fujii | ...................... | H04N 7/142 348/14.08 |
| 7,227,960 B2 * | 6/2007 | Kataoka | ................. | B25J 13/003 381/92 |

(Continued)

FOREIGN PATENT DOCUMENTS

| CN | 101295016 A | 10/2008 |
|---|---|---|
| CN | 102305925 A | 1/2012 |

(Continued)

OTHER PUBLICATIONS

Written Opinion of the ISA; dated Nov. 24, 2016; PCT/CN2016/096361.

*Primary Examiner* — Shreyans A Patel
(74) *Attorney, Agent, or Firm* — Ladas & Parry LLP

(57) ABSTRACT

Disclosed herein are method and device for processing received sound. The method includes receiving at least three sets of sound sent by at least three microphones of an apparatus; calculating a position of a sounding point in a three-dimensional space according to the at least three sets of sound; and adjusting a physical position of the apparatus according to the position of the sounding point in the three-dimensional space and an optimal sound receiving region of the apparatus, so as to approach or contain the position of the sounding point relative to the optimal sound receiving region of the apparatus. The physical position includes a spatial position and orientation of the apparatus. The embodiments can accurately determine the position of the sounding point, and then adjust state of the apparatus (Continued)

according to the position of the sounding point, to ensure the optimization of the sound reception effect.

12 Claims, 3 Drawing Sheets

(51) Int. Cl.
    *H04M 1/19*     (2006.01)
    *H04S 3/00*     (2006.01)
    *H04M 1/60*     (2006.01)

(56) References Cited

U.S. PATENT DOCUMENTS

| | | | | |
|---|---|---|---|---|
| 9,338,575 | B2 * | 5/2016 | Mitra | H04N 7/183 |
| 9,412,354 | B1 * | 8/2016 | Ramprashad | H04R 3/005 |
| 9,640,179 | B1 * | 5/2017 | Hart | G10L 15/20 |
| 2004/0175006 | A1 * | 9/2004 | Kim | H04R 1/406 |
| | | | | 381/92 |
| 2005/0259832 | A1 * | 11/2005 | Nakano | H04R 1/406 |
| | | | | 381/92 |
| 2006/0143017 | A1 * | 6/2006 | Sonoura | G10L 15/26 |
| | | | | 704/275 |
| 2008/0312918 | A1 * | 12/2008 | Kim | G10L 15/01 |
| | | | | 704/233 |
| 2010/0329479 | A1 * | 12/2010 | Nakadai | B25J 9/00 |
| | | | | 381/92 |
| 2012/0062729 | A1 * | 3/2012 | Hart | G06F 1/1626 |
| | | | | 348/135 |
| 2012/0320143 | A1 * | 12/2012 | Chu | H04N 7/15 |
| | | | | 348/14.08 |
| 2014/0139426 | A1 * | 5/2014 | Kryze | G06F 3/011 |
| | | | | 345/156 |
| 2015/0022636 | A1 | 1/2015 | Savransky | |

FOREIGN PATENT DOCUMENTS

| | | | |
|---|---|---|---|
| CN | 103064061 A | | 4/2013 |
| CN | 103176167 A | * | 6/2013 |
| CN | 103366756 A | | 10/2013 |
| CN | 103472434 A | | 12/2013 |
| CN | 103716724 A | | 4/2014 |
| CN | 103856877 A | * | 6/2014 |
| CN | 104010251 A | | 8/2014 |
| CN | 105163209 A | | 12/2015 |
| JP | 2003029830 A | | 1/2003 |
| JP | 2006181651 A | | 7/2006 |
| JP | 2011155372 A | | 8/2011 |
| JP | 2014197771 A | | 10/2014 |

* cited by examiner

US 10,306,360 B2

METHOD AND DEVICE FOR PROCESSING RECEIVED SOUND AND MEMORY MEDIUM, MOBILE TERMINAL, ROBOT HAVING THE SAME

TECHNICAL FIELD

The present invention relates to sound collection technical field, and particularly, to a method, device, memory medium, mobile terminal, and robot for processing received sound.

BACKGROUND

In prior art, a single apparatus may equip with one or more microphones (mics for short) for receiving sound. For example, a cell phone includes a hand-held main mic, a loudspeaking-mode main mic, and a noise-reduction mic. Other apparatuses vary in the number of microphones.

At present, most of the existing apparatuses primarily receive sound in a passive manner, i.e., they are statically located in certain positions, and receive sound when detecting the sound. However, the effect of the sound received in this manner is not favorable. If the sound comes from a direction in non-ideal conditions, the received sound is not ideal, either, which may further cause a great difficulty in the subsequent identification of the sound.

The prior art has a disadvantage as follows.

Most of the existing apparatuses receive sound statically such that the received sound is not ideal.

SUMMARY

The embodiments of the present invention provide a method, device, non-transitory memory medium, mobile terminal, and robot for processing received sound, to address the technical problem that most of the existing apparatuses receive sound statically such that the received sound is not ideal in the prior art.

In one aspect, the embodiments of the present invention provide a method for processing received sound, the method includes receiving at least three sets of sound sent by at least three microphones of an apparatus; calculating a position of a sounding point in a three-dimensional space according to the at least three sets of sound; and adjusting a physical position of the apparatus according to the position of the sounding point in the three-dimensional space and an optimal sound receiving region of the apparatus, so as to approach or contain the position of the sounding point relative to the optimal sound receiving region of the apparatus. The physical position includes a spatial position and orientation of the apparatus.

In another aspect, the embodiments of the present invention provide a device for processing received sound, includes at least three microphones, receiving at least three sets of sound; a processor means for calculating a position of a sounding point in a three-dimensional space according to the at least three sets of sound; and a position adjusting component for adjusting a physical position of the device according to the position of the sounding point in the three-dimensional space and an optimal sound receiving region of the device, so as to approach or contain the position of the sounding point relative to the optimal sound receiving region of the device. The physical position includes spatial position and orientation of the device.

In another aspect, the embodiments of the present invention provide a non-transitory memory medium. The non-transitory memory medium, storing instructions for executing the steps of, includes receiving at least three sets of sound sent by at least three microphones of an apparatus with the non-transitory memory medium; calculating a position of a sounding point in a three-dimensional space according to the at least three sets of sound; and adjusting a physical position of the apparatus with the non-transitory memory medium according to the position of the sounding point in the three-dimensional space and an optimal sound receiving region of the apparatus, so as to approach or contain the position of the sounding point relative to the optimal sound receiving region of the apparatus. The physical position includes a spatial position and orientation of the apparatus.

BRIEF DESCRIPTION OF THE DRAWINGS

The specific embodiments of the present invention are described with reference to attached drawings as follows, wherein.

DETAILED DESCRIPTION

To make the technical solutions and advantages of the present invention more apparent and explicit, explanations are further elaborated with reference to the exemplary embodiments of the present invention as follows. Obviously, the described embodiments are only part of the embodiments of the present invention, rather than exhaustion of all the embodiments. Moreover, the embodiments of the present invention, as well as the features therein, can be combined with each other if they do not conflict with each other.

In the process of invention, the inventor takes notice of problems as follows:

most of the existing apparatuses primarily receive sound in a static manner, and do not judge directions of the sound or adjust themselves to directions in which the received sound is optimal;

moreover, take a cell phone for example, although it has a hand-held main mic, a loudspeaking-mode main mic, and a noise-reduction mic, at most two microphones are working simultaneously; the cell phone itself can neither judge in which direction sound comes nor adjust its own direction to achieve an optimal effect.

Given these problems, the embodiments of the present invention provide a method, device, memory medium, mobile terminal, and robot for processing received sound, and make explanations as follows.

Figure 1:
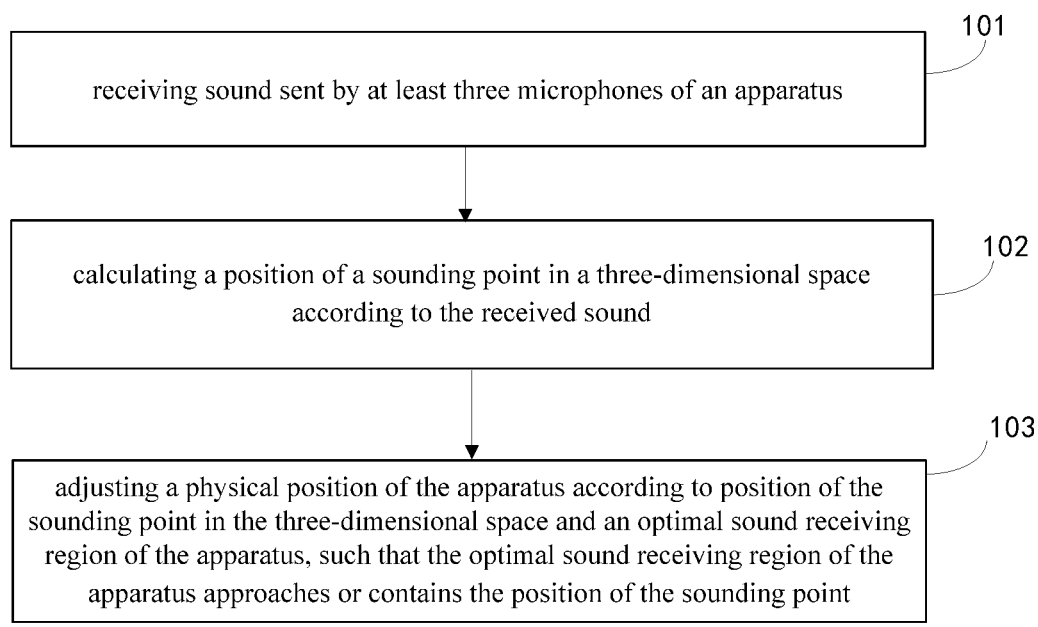
FIG. 1 is a flow diagram of the implementation of a method for processing received sound in the embodiments of the present invention.

FIG. 1 is a flow diagram of the implementation of a method for processing received sound in the embodiments of the present invention. As shown in the figure, the method for processing received sound can comprise steps as follows:

Step 101, receiving sound sent by at least three microphones of an apparatus;

Step 102, calculating a position of a sounding point in a three-dimensional space according to the received sound;

Step 103, adjusting a physical position of the apparatus according to the position of the sounding point in the three-dimensional space and an optimal sound receiving region of the apparatus, such that the optimal sound receiving region of the apparatus approaches or contains the position of the sounding point.

During the specific implementation, the sound can be received with three, four or more microphones of the apparatus; the positions where the microphones are placed can be arranged according to practical needs; the optimal sound receiving region of the apparatus can be determined according to the positions where the microphones are placed. In general, after positions of hardware (such as microphones) of an apparatus are determined, an optimal sound receiving region of the apparatus is determined. The optimal sound receiving region in the embodiments of the present invention refers to a region where the sound reception effect of the microphones of the apparatus is the best (or optimal) in space around the apparatus, wherein the region has a relatively fixed positional relation with the apparatus.

In general case, the sound reception effect is optimal when a sound source aligns with a central axis of a microphone, leaving a zero-degree included angle. In other words, for a single microphone, the sound reception effect is the best when the sound travels along the axis. However, for multiple microphones on the apparatus, not an intersection of audition of all the microphones is the optimal region, and the reason is that the microphones may vary in function, e.g., they are divided into a main mic and a mic for reducing noise. The optimal audition range of the apparatus is determined after perfect adjustment of the apparatus; the specific spatial position of the optimal audition range depends on the apparatus itself and the adjustment; the optimal reception region can be determined according to the prior art.

The embodiments of the present invention can adjust the optimal sound receiving region of the apparatus by adjusting the physical position of the apparatus, to achieve a better sound reception effect. During the specific implementation, there may be two cases as follows.

One case is that the optimal sound receiving region of the apparatus contains the position of the sounding point. This case can also be referred to as an optimal sound reception state. The optimal sound receiving region of the apparatus can be adjusted by adjusting the physical position of the apparatus, such that the optimal sound receiving region contains the position of the sounding point. Since the position of the sounding point is within the optimal sound receiving region of the apparatus, it can be ensured that the sound reception effect of the apparatus is optimal.

The optimal sound receiving region of the apparatus can be a collection of points in a priority order, which collection can include optimal sound reception points 001, 002, . . . etc. During the specific implementation, first of all, the physical position of the apparatus can be adjusted according to the position of the sounding point and the optimal sound reception point 001, such that the optimal sound reception point 001 superposes the position of the sounding point; if the apparatus fails the optimal sound reception point 001 for various reasons, 002 can be selected as the optimal sound reception point according to the priority order, then the physical position of the apparatus is adjusted according to 002 and the position of the sounding point, such that the optimal sound reception point 002 superposes the position of the sounding point.

The other case is that the optimal sound receiving region of the apparatus approaches the position of the sounding point.

During the specific implementation, for external reasons or its own reasons, the apparatus may not be adjusted to an optimal sound reception state, i.e., a state that the optimal sound receiving region of the apparatus contains the position of the sounding point; for example, the apparatus is blocked by other objects, or its own state adjustment device is short of power, etc. The embodiments of the present invention can adjust the physical position of the apparatus, such that the optimal sound receiving region of the apparatus approaches the position of the sounding point, to achieve a better sound reception effect than before adjustment. In this case, the optimal sound receiving region of the apparatus only needs to approximate the position of the sounding point, and does not need to contain the position of the sounding point completely.

Both of the two cases provided in the embodiments of the present invention, the optimal sound receiving region contains the position of the sounding point, and the optimal sound receiving region approaches the position of the sounding point, can achieve a better sound reception effect than before adjustment.

The physical position of the apparatus in the embodiments of the present invention can include a spatial position and orientation of the apparatus. For example, the spatial position of the apparatus can be adjusted such that the optimal sound receiving region approaches or contains the position of the sounding point, e.g., the apparatus is moved 30 centimeters to the left; alternatively, the orientation of the apparatus can be adjusted (i.e., without change in the spatial position, only the orientation of the apparatus is changed) such that the optimal sound receiving region approaches or contains the position of the sounding point, e.g., the current orientation of the apparatus is changed 90 degrees clockwise; alternatively, both the spatial position and orientation of the apparatus can be adjusted such that the optimal sound receiving region approaches or contains the position of the sounding point, e.g., the apparatus is moved 30 centimeters to the left while the current orientation of the apparatus is changed 90 degrees clockwise.

Since the embodiments of the present invention receive the sound with at least three microphones, in the subsequent calculation of the position of the sounding point, the position of the sounding point in a three-dimensional space can be calculated to ensure that the calculation of the position of the sounding point is more accurate.

Moreover, the embodiments of the present invention not only adjust the state of the apparatus according to the position of the sounding point in the three-dimensional space, but also adjust the physical position of the apparatus by combining the position of the sounding point in the three-dimensional space with the optimal sound receiving region of the apparatus, such that the optimal sound receiving region of the apparatus approaches or contains the position of the sounding point, thereby more accurately adjusting the apparatus to a position with a better sound reception effect, and ensuring a superior sound reception effect.

During the implementation, to be specific, said calculating a position of a sounding point in a three-dimensional space according to the received sound can be:

calculating a difference in distance from the sounding point to every two microphones according to a phase difference in the received sound;

establishing a three-dimensional model, and determining an intersection of at least three three-dimensional curved surfaces;

wherein the difference in distance from the sounding point to two microphones can be calculated according to a difference in time when the two microphones receive the sound and a sound velocity, and wherein the three-dimensional curved surface refers to a collection of points, the difference in distance from which to the two microphones is equal to the above value (i.e., the difference in distance from the sounding point to the two microphones); the definition of a hyperbolic curve is available for reference, but herein a hyperboloid of the three-dimensional space is provided;

determining the position of the sounding point according to the intersection of said at least three three-dimensional curved surfaces.

During the specific implementation, since different microphones are in different positions, there must be a certain difference between phases where the sound is received; the embodiments of the present invention can judge the phase difference in the received sound in a buffer memory after the microphones receive the sound, thereby calculating the difference in distance from the position of the sounding point to every two microphones.

For example, suppose there are microphones mic1, mic2, mic3, and mic4, it can be obtained from calculation that the difference in distance from the sounding point to mic2 and mic1 is b-a, the difference in distance from the sounding point to mic3 and mic2 c-b, the difference in distance from the sounding point to mic4 and mic3 d-c, the difference in distance from the sounding point to mic3 and mic1 c-a, the difference in distance from the sounding point to mic4 and mic1 d-a, and the difference in distance from the sounding point to mic4 and mic2 d-b.

A three-dimensional model is established, and multiple three-dimensional curved surfaces are obtained, and can be as follows respectively:

a collection of all points, the difference in distance from which to mic2 and mic1 is b-a (a three-dimensional curved surface 1);

a collection of all points, the difference in distance from which to mic3 and mic2 is c-b (a three-dimensional curved surface 2);

a collection of all points, the difference in distance from which to mic4 and mic3 is d-c (a three-dimensional curved surface 3);

a collection of all points, the difference in distance from which to mic3 and mic1 is c-a (a three-dimensional curved surface 4);

a collection of all points, the difference in distance from which to mic4 and mic1 is d-a (a three-dimensional curved surface 5);

a collection of all points, the difference in distance from which to mic4 and mic2 is d-b (a three-dimensional curved surface 6).

As long as the intersection of these curved surfaces is determined, the position of the sounding point can be determined.

According to the sound received by at least three microphones, the embodiments of the present invention execute the calculation of the position of the sounding point by establishing the three-dimensional model and calculating the intersection of the three-dimensional curved surfaces, thereby further improving the calculation accuracy of the position of the sounding point.

During the implementation, to be specific, said determining the position of the sounding point according to the intersection of said at least three three-dimensional curved surfaces can be:

determining, when the intersection figured out is two points, a space where the sounding point locates is determined according to intensity of the sound the microphones received, wherein the space includes a front half space and a back half space of the apparatus, and determining that one of the two points to be the position of the sounding point according to the space where the sounding point is;

determining, when the intersection figured out is one point, that the intersection is the position of the sounding point.

When the intersection of the curved surfaces is two points, it can be learned that one of the two points is the sounding point, and the other is a point symmetric to the sounding point with respect to a plane of the microphones. At this moment, which point is the sounding point needs to be further determined. As the microphones usually are not arranged to face a single direction, in the embodiments of the present invention, it can be learned whether the position of the sounding point is located in the front half space or back half space of the apparatus by comparing the intensity of the sound that different microphones receive.

During the specific implementation, the space can be divided into two spatial regions according to a plane of the apparatus, and the orientation of the microphone that receives the sound with the greatest intensity is taken as the spatial region corresponding to the sounding point.

In the embodiments of the present invention, there are two specific cases when determining the position of the sounding point. One case is that the intersection is one point. In this case, the intersection is the position of the sounding point. The other case is that the intersection is two points. In this case, the position of the sounding point is further determined by dividing the apparatus into a front half space and a back half space, such that the result of the calculation is more accurate.

During the implementation, the apparatus can be a robot; to be specific, said adjusting a physical position of the apparatus can be:

adjusting an orientation and position of the robot by controlling steering and walking of the robot.

During the specific implementation, the apparatus can be a robot; the sound can be received with the microphones of the robot; after calculating the position of the sounding point, the robot is controlled to execute operations, such as turning and moving, according to the position of the sounding point in the three-dimensional space and the optimal sound receiving region of the robot, to adjust the orientation and position of the robot, such that the robot can better receive the sound.

In a scenario of executing voice interaction with the robot, the solution provided in the embodiments of the present invention can ensure that the robot accurately receives sound that a user makes, and improves the accuracy of the subsequent voice identification to some degree, thereby improving the user experience in the process of the voice interaction with the robot.

During the implementation, the apparatus can be a mobile terminal, such as a cell phone, a tablet computer, a laptop computer, and the like; the sound can be received with at least three microphones of the mobile terminal; the position of the sounding point is calculated in a three-dimensional space; the optimal sound receiving region of the mobile terminal is determined according to the positions where the microphones are placed on the mobile terminal; finally, the vibrating device is controlled to vibrate according to the position of the sounding point and the optimal sound receiving region, such that the mobile terminal changes directions in a plane where the mobile terminal is.

The solution provided in the embodiments of the present invention can turn on hands-free-mode answer to an incoming call when a communication apparatus is in the hands free mode, e.g., when the user is not convenient to hold the cell phone while washing up or having a meal; at this moment, the cell phone can vibrate automatically to the optimal sound reception state, such that the effect of the sound that the user receives is more ideal.

To facilitate the implementation of the present invention, instances are provided for explanations as follows.

Figure 2:
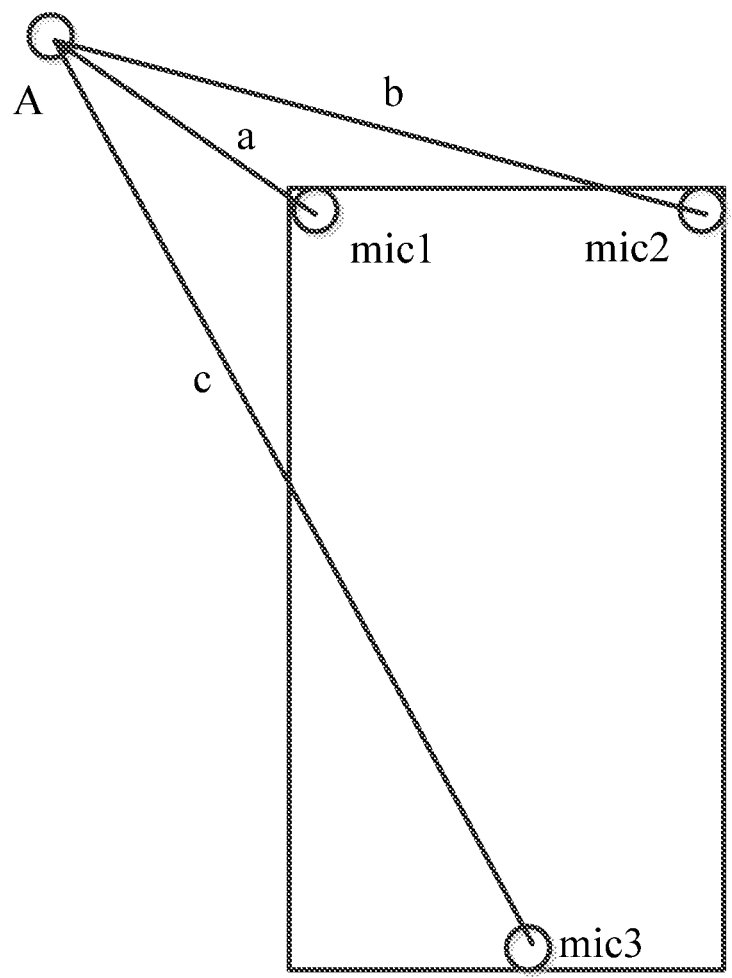
FIG. 2 is a diagram of positions where microphones on an apparatus are placed in the embodiments of the present invention.

The embodiments of the present invention make explanations by an example of an apparatus that has three microphones. FIG. 2 is a diagram of positions where microphones on an apparatus are placed in the embodiments of the present invention. The three microphones on the apparatus are, as shown in the figure, mic1, mic2, and mic3, respectively. Suppose sound comes from Point A, and the straight-line distance from Point A to the three microphones is a, b, and c, respectively.

First of all, the apparatus can control the three microphones to receive the sound simultaneously, and judge the phase difference of receiving the sound in a buffer memory, thereby calculating the difference in distance from the sounding point to every two microphones. As shown in FIG. 2, the absolute numbers of b-a, c-a, and c-b can be obtained.

Since the positions where its own microphones are placed (assembly positions for short) known to the apparatus itself, a plane of the apparatus and a plane of the three microphones can be obtained, and then a three-dimensional model can be established.

Figure 3:
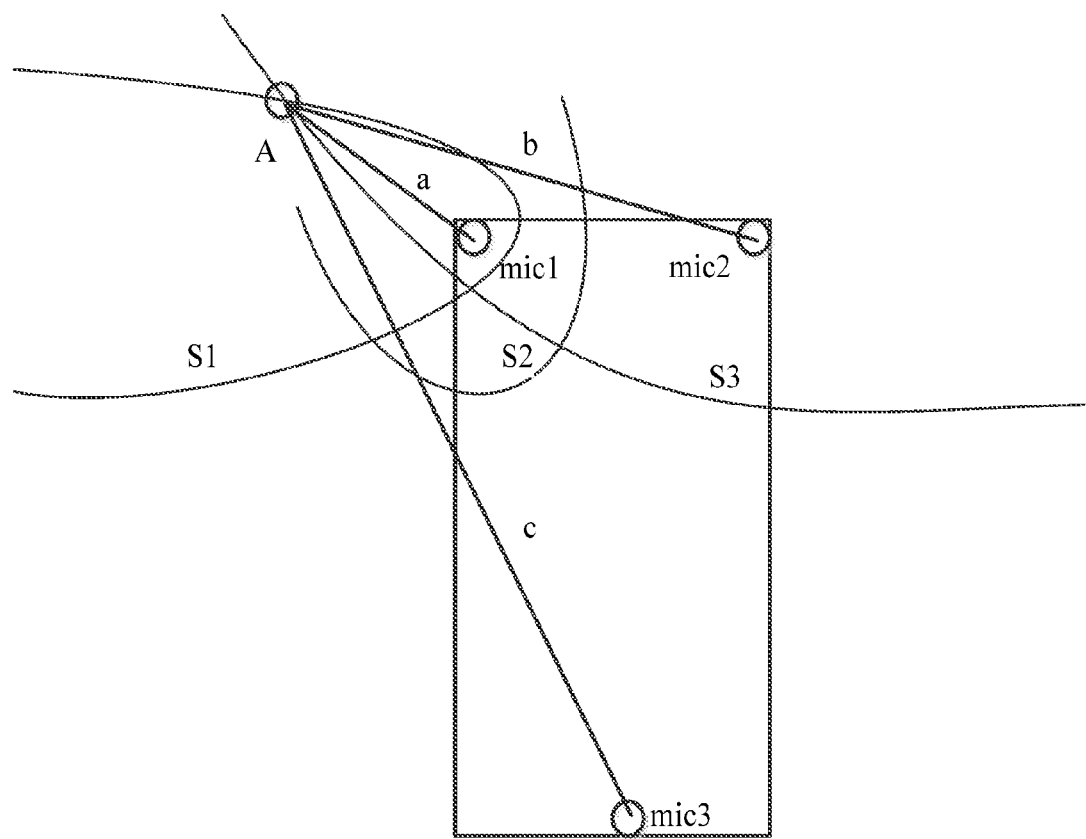
FIG. 3 is a diagram of an established three-dimensional model in the embodiments of the present invention.

FIG. 3 is a diagram of an established three-dimensional model in the embodiments of the present invention. As shown in the figure, a collection of all points, the difference in distance from which to mic2 and mic1 is b-a, is a three-dimensional curved surface S1, a collection of all points, the difference in distance from which to mic3 and mic1 is c-a, is a three-dimensional curved surface S2, and a collection of all points, the difference in distance from which to mic3 and mic2 is c-b, is a three-dimensional curved surface S3. The intersection of any two curved surfaces is a line. An intersection point of this line and the third curved surface is the sounding point, or a point symmetric to the sounding point; as shown in the figure, the sounding point A is located on the intersection line of the curved surfaces S1 and S3, and is also located on the curved surface S2 simultaneously.

Determining the intersection of the three curved surfaces results in two cases as follows:

if the sounding point is located on a single plane formed by the three microphones, the intersection of the three curved surfaces is only a single point, i.e., it can be determined that this point is the position of the sounding point;

otherwise, the intersection of the three curved surface is two points, one is the sounding point A, and the other is a point A' symmetric to Point A with respect to the three microphones as a plane.

In general case, it can be learned from the perspective of design that the three microphones usually do not face a single direction. Thus, it can be learned that the sounding point is located in the front half space or back half space of the apparatus by comparing the intensity of the sound that the three microphones receive. If the space where the apparatus is is divided into two regions, a positive one and a negative one, the orientation of the microphone that receives the sound with the greatest intensity can be taken as the space where the sounding point is.

Which region in the three-dimensional space the optimal sound receiving region is in, which region a sub-optimal region is in, among others, can be determined according to the positions where the three microphones are placed.

In general case, once the positions where the three microphones are placed are determined, there will be one region that is the best in the sound reception effect, and adjustment can be accomplished by user usage scenarios to determine the optimal sound receiving region of the apparatus. Generally speaking, the optimal sound receiving region of the apparatus is a region in the due front of the apparatus. For example, in a 3GPP noise reduction test scheme, the position 30 centimeters from the due front of the apparatus is the test point for the noise reduction in the loudspeaking mode, i.e., the region 30 centimeters from the due front of the apparatus is the optimal sound receiving region of the apparatus; moving up, down, left and right to reach a certain angle is followed by certain deterioration of the test results.

In the prior art, the noise reduction scheme and apparatus adjustment conditions may have a certain influence on determining the optimal sound receiving region of the apparatus, and persons skilled in the art can use different manners to determine the optimal sound receiving region of the apparatus according to practical needs, which is not elaborated in the present invention.

During the specific implementation, the adjustment of the apparatus is generally made according to the user usage scenarios, thus in different usage scenarios (such as loudspeaking mode and handheld mode of the cell phone), the optimal sound receiving region of the apparatus may also be different.

In the embodiments of the present invention, the apparatus can adjust its own orientation and position according to the positions of the sounding point and the optimal sound receiving region in the three-dimensional space, to achieve the purpose of receiving sound or signals in a best way.

In the process of the adjustment, the above step of receiving sound, calculating a position of a sounding point, and determining an optimal sound receiving region can still be executed to achieve a closed-loop operation and accomplish the adjustment more accurately and quickly.

The embodiments of the present invention can identify directions according to three or more microphones on the apparatus and automatically adjust the direction of the apparatus to optimize the sound reception.

Based on the same inventive concept, the embodiments of the present invention further provide a memory medium, in which instructions for executing the method are stored.

Based on the same inventive concept, the embodiments of the present invention further provide a device for processing received sound. Since the principles how the device solve problems are similar to those of the method for processing received sound, for the implementation of the device, see that of the method, which is not elaborated herein.

Figure 4:
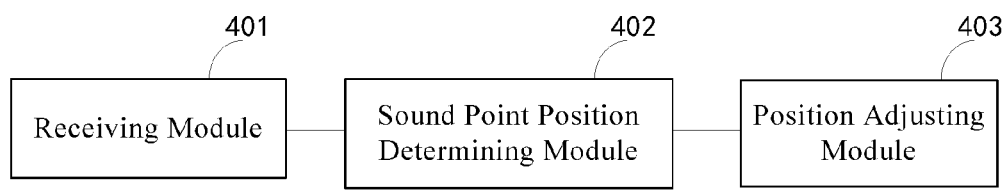
FIG. 4 is a structure diagram of a device for processing received sound in the embodiments of the present invention.

FIG. 4 is a structure diagram of a device for processing received sound in the embodiments of the present invention. As shown in the figure, the device for processing received sound can comprise:

a receiving module 401 for receiving sound which is sent to the device by at least three microphones of an apparatus;

a sounding point position calculating module 402 for determining a position of a sounding point in a three-dimensional space according to the received sound;

a position adjusting module 403 for adjusting a physical position of the apparatus according to the position of the sounding point in the three-dimensional space and an optimal sound receiving region of the apparatus, such that the optimal sound receiving region of the apparatus approaches or contains the position of the sounding point.

During the implementation, to be specific, the sounding point position calculating module can comprise:

a first calculation unit for determining a difference in distance from the sounding point to every two microphones according to a phase difference in the received sound;

a second calculation unit for establishing a three-dimensional model, and determining an intersection of at least three three-dimensional curved surfaces; wherein the three-dimensional curved surfaces are collections of points, the difference in distance from which to every two microphones is equal to the difference ill distance from the sounding point to every two microphones;

a determination unit for determining the position of the sounding point according to the intersection of said at least three three-dimensional curved surfaces.

During the implementation, to be specific, the determination unit can be used for: determining, when the intersection figured out is two points, a space where the sounding point locates is determined according to intensity of the sound the microphones received, wherein the space includes a front half space and a back half space of the apparatus, and determining that one of the two points to be the position of the sounding point according to the space where the sounding point is; and determining, when the intersection figured out is one point, that the intersection is the position of the sounding point.

During the implementation, the position adjusting module can be further used for selecting a sub-optimal sound receiving region from sound receiving regions of the apparatus sorted by sound reception quality when a state of the apparatus cannot be adjusted such that the optimal sound receiving region of the apparatus contains the position of the sounding point, and adjusting the state of the apparatus such that the sub-optimal sound receiving region contains the position of the sounding point.

During the implementation, the apparatus can be a robot; to be specific, the position adjusting module can be used for adjusting an orientation and position of the robot by controlling steering and walking of the robot.

During the implementation, the apparatus can be a mobile terminal; to be specific, the position adjusting module can be used for controlling a vibrating motor to vibrate such that the mobile terminal changes directions in a plane where the mobile terminal is.

Based on the same inventive concept, the embodiments of the preset invention further provide a mobile terminal, comprising a processor, at least three microphones, a vibrating motor and the memory medium, wherein the processor is used for executing instructions stored in the memory medium.

Based on the same inventive concept, the embodiments of the preset invention further provide a robot, comprising a processor, at least three microphones, and the memory medium, wherein the processor is used for executing instructions stored in the memory medium.

In the above embodiments, the existing functional elements or modules can be used for the implementation. For example, the existing sound reception elements can be used as microphones; at least, headphones used in the existing communication devices have elements that perform the function; regarding the sounding position determining module, its calculation of the position of the sounding point can be realized by persons skilled in the art by using the existing technical means through corresponding design and development; meanwhile, the position adjusting module is an element that any apparatuses with the function of adjusting the state of the apparatus have.

For the convenience of description, all the components of the device are divided into various modules or units according to functions, and are separately described. Certainly, when the present invention is carried out, the functions of these modules or units can be achieved in one or more hardware or software.

Persons skilled in the art should understand that the embodiments of the present invention can be provided for a method, system, or computer program product. Thus, the present invention can be in form of all-hardware embodiments, all-software embodiments, or hardware-software embodiments. Moreover, the present invention can be in form of a computer program product implemented on one or more computer-applicable memory media (including, but not limited to, disk memory, CD-ROM, optical disk, etc.) containing computer-applicable procedure codes therein.

The present invention is described with reference to the flow diagrams and/or block diagrams of the method, apparatus (system), and computer program product of the embodiments of the present invention. It should be understood that computer program instructions realize each flow and/or block in the flow diagrams and/or block diagrams as well as a combination of the flows and/or blocks in the flow diagrams and/or block diagrams. These computer program instructions can be provided to a processor of a general-purpose computer, a special-purpose computer, an embedded memory, or other programmable data processing apparatuses to generate a machine, such that the instructions executed by the processor of the computer or other programmable data processing apparatuses generate a device for performing functions specified in one or more flows of the flow diagrams and/or one or more blocks of the block diagrams.

These computer program instructions can also be stored in a computer-readable memory that can guide the computer or other programmable data processing apparatuses to operate in a specified manner, such that the instructions stored in the computer-readable memory generate an article of manufacture including an instruction device. The instruction device performs functions specified in one or more flows of the flow diagrams and/or one or more blocks of the block diagrams.

These computer program instructions may also be loaded on the computer or other programmable data processing apparatuses to execute a series of operations and steps on the computer or other programmable data processing apparatuses, such that the instructions executed on the computer or other programmable data processing apparatuses provide steps for performing functions specified ill one or more flows of the flow diagrams and/or one or more blocks of the block diagrams.

Although preferred embodiments of the present invention have been described, persons skilled in the art can alter and modify these embodiments once they know the fundamental inventive concept. Therefore, the attached claims should be construed to include the preferred embodiments and all the alternations and modifications that fall into the extent of the present invention.

What is claimed is:

1. A method for processing received sound comprising:
   receiving at least three sets of sound sent by at least three microphones of an apparatus;

calculating a position of a sounding point in a three-dimensional space according to the at least three sets of sound; and adjusting a physical position of the apparatus according to the position of the sounding point in the three-dimensional space and an optimal sound receiving region of the apparatus, so as to approach or contain the position of the sounding point relative to the optimal sound receiving region of the apparatus, wherein the physical position comprises a spatial position and orientation of the apparatus, and wherein the calculating a position of a sounding point in a three-dimensional space according to the at least three sets of sound comprises:

calculating a difference in distance from the sounding point to every two microphones according to a phase difference in two sets of sound;

establishing a three-dimensional model, and figuring an intersection of at least three three-dimensional curved surfaces, wherein the three-dimensional curved surfaces are collections of points with difference in distance from which to every two microphones is equal to difference in distance from the sounding point to the every two microphones; and determining the position of the sounding point according to the intersection of at least three three-dimensional curved surfaces.

2. The method of claim 1, wherein the determining the position of the sounding point according to the intersection of at least three three-dimensional curved surfaces comprises:

determining, when the intersection figured out is two points, a space where the sounding point is located according to sound intensity of the microphones, and determining one of the two points to be the position of the sounding point according to the space where the sounding point is located; and determining, when the intersection figured out is one point, the one point to be the position of the sounding point.

3. The method of claim 1, wherein the apparatus is a robot, and the adjusting a physical position of the apparatus comprises:

adjusting orientation and position of the robot by controlling steering and walking of the robot.

4. The method of claim 1, wherein the apparatus is a mobile terminal, and the adjusting a physical position of the apparatus comprises:

controlling a vibrating motor to vibrate to change directions of the mobile terminal.

5. A device for processing received sound, comprising:

at least three microphones, adapted to receive at least three sets of sound;

a processor adapted to calculate a position of a sounding point in a three-dimensional space according to the at least three sets of sound; and a position adjusting component adapted to adjust a physical position of the device according to the position of the sounding point in the three-dimensional space and an optimal sound receiving region of the device, so as to approach or contain the position of the sounding point relative to the optimal sound receiving region of the device, wherein the physical position comprises spatial position and orientation of the device and wherein the processor for calculating the position of the sounding point comprises:

a first calculating unit adapted to calculate a difference in distance from the sounding point to every two microphones according to a phase difference in two sets of sound;

a second calculating unit adapted to establish a three-dimensional model, and calculating an intersection of at least three three-dimensional curved surfaces; wherein the three-dimensional curved surfaces are collections of points with difference in distance from which to every two microphones is equal to difference in distance from the sounding point to the every two microphones; and a determination unit adapted to determine the position of the sounding point according to the intersection of said at least three three-dimensional curved surfaces.

6. The device of claim 5, wherein the determination unit is used for:

determining, when the intersection figured out is two points, a space where the sounding point is located according to sound intensity of the microphones, and determining one of the two points to be the position of the sounding point according to the space where the sounding point is located;

determining, when the intersection figured out is one point, the one point to be the position of the sounding point.

7. The device of claim 5, wherein the device is a robot, and the position adjusting component is used for adjusting orientation and position of the robot by controlling steering and walking of the robot.

8. The device of claim 5, wherein the device is a mobile terminal, and the position adjusting component a vibrating motor to vibrate to change directions of the mobile terminal.

9. A non-transitory memory medium, storing instructions for executing the steps comprising receiving at least three sets of sound sent by at least three microphones of an apparatus with the non-transitory memory medium;

calculating a position of a sounding point in a three-dimensional space according to the at least three sets of sound; and adjusting a physical position of the apparatus with the non-transitory memory medium according to the position of the sounding point in the three-dimensional space and an optimal sound receiving region of the apparatus, which is determined by the positions of the microphones, so as to approach or contain the position of the sounding point relative to the optimal sound receiving region of the apparatus, wherein the physical position comprises a spatial position and orientation of the apparatus; and wherein the calculating a position of a sounding point in a three-dimensional space according to the at least three sets of sound comprises:

calculating a difference in distance from the sounding point to every two microphones according to a phase difference in two sets of sound;

establishing a three-dimensional model, and figuring an intersection of at least three three-dimensional curved surfaces, wherein the three-dimensional curved surfaces are collections of points with difference in distance from which to every two microphones is equal to difference in distance from the sounding point to the every two microphones; and determining the position of the sounding point according to the intersection of at least three three-dimensional curved surfaces.

10. The non-transitory memory medium of claim 9, wherein the determining the position of the sounding point according to the intersection of at least three three-dimensional curved surfaces comprises:

determining, when the intersection figured out is two points, a space where the sounding point is located according to sound intensity of the microphones, and determining one of the two points to be the position of the sounding point according to the space where the sounding point is located; and determining, when the intersection figured out is one point, the one point to be the position of the sounding point.

11. The non-transitory memory medium of claim 9, wherein the apparatus with the non-transitory memory medium is a robot, and the adjusting a physical position of the apparatus comprises:

adjusting orientation and position of the robot by controlling steering and walking of the robot.

12. The non-transitory memory medium of claim 9, wherein the apparatus with the non-transitory memory medium is a mobile terminal, and the adjusting a physical position of the apparatus comprises:

controlling a vibrating motor to vibrate to change directions of the mobile terminal.

\* \* \* \* \*